June 2, 1953     J. V. CAPUTO ET AL     2,640,942
HOMOPOLAR DYNAMOELECTRIC MACHINE
Original Filed Oct. 16, 1947
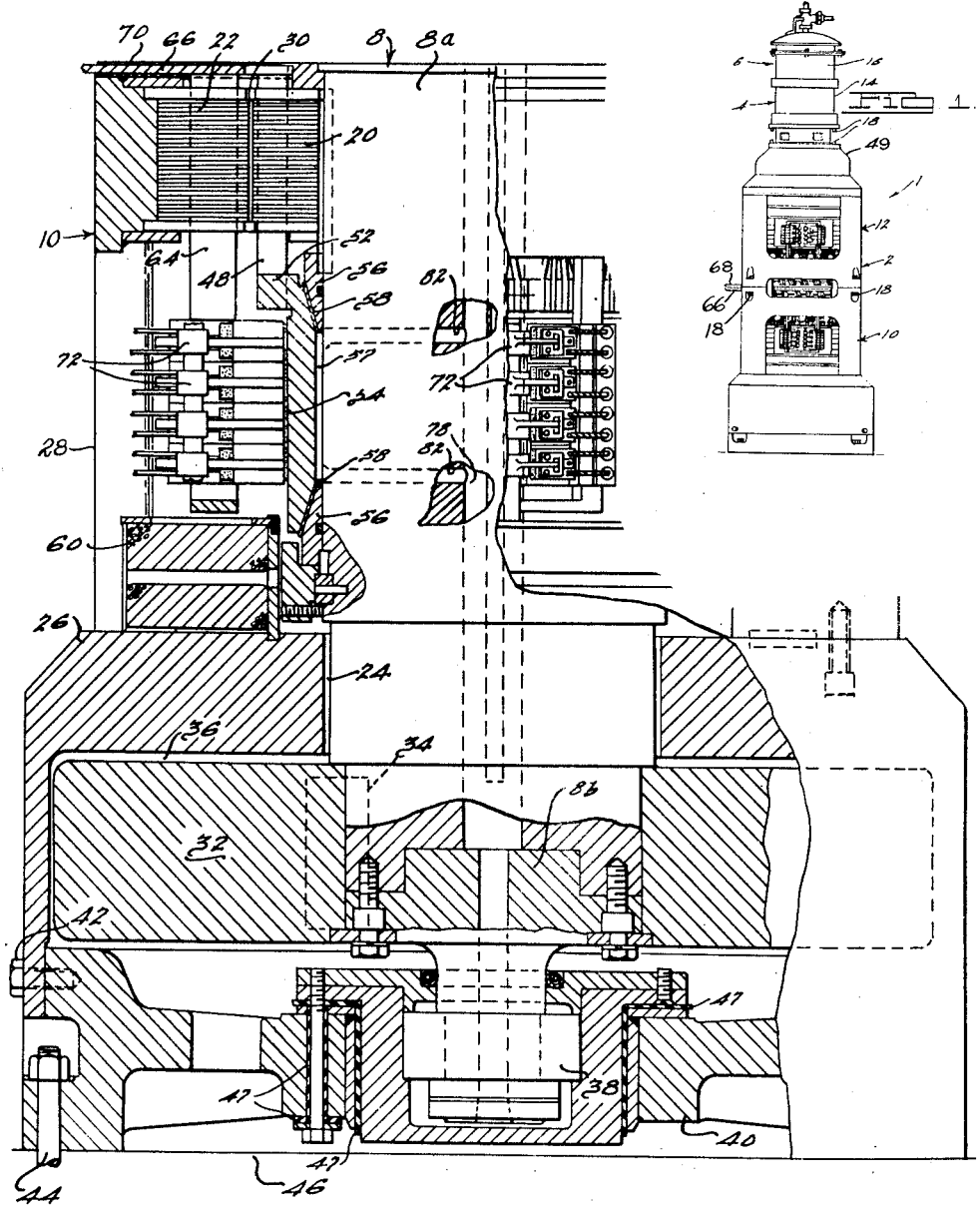
INVENTORS.
James V. Caputo.
Thomas J. Crawford.
BY
Harness, Dickey & Pierce.
ATTORNEYS.

Patented June 2, 1953

2,640,942

UNITED STATES PATENT OFFICE 2,640,942

HOMOPOLAR DYNAMOELECTRIC MACHINE

James V. Caputo, Youngstown, Ohio, and Thomas J. Crawford, Berkley, Mich.; said Crawford assignor to said Caputo Original application October 16, 1947, Serial No. 780,170, now Patent No. 2,600,844, dated June 17, 1952. Divided and this application October 22, 1951, Serial No. 252,552

5 Claims. (Cl. 310—178)

The present invention relates to rotating electrical apparatus and more specifically to an electric dynamo which is adapted, among other uses, for the supplying of heavy pulses of current for relatively short intervals for a spot, projection, or flash-type electric resistance welding and is a division of our copending application, Serial No. 780,170, filed October 16, 1947, for Electrical Apparatus, now Patent No. 2,600,844, dated June 17, 1952. Other features shown but not claimed herein are shown and claimed in our copending application, Serial No. 230,152, filed June 6, 1951, and application, Serial No. 252,551, filed October 22, 1951.

The principal objects of the present invention are: to provide an improved electrical current generating apparatus of the character described; to provide a new and improved energy storage and conversion apparatus; to provide an improved energy storage dynamoelectric machine having a flywheel for energy storage; to provide such a machine which rotates about a vertical axis; to provide means for reducing the end thrust against the bearings in such a vertically arranged electric machine; to provide a flux path for such a vertically arranged machine which includes at least a portion of the flywheel whereby the attractive effect of the flux will support the flywheel; and generally to provide a new and improved electric power-generating apparatus for use in welding systems.

Other and more detailed objects of the invention will appear in the following description and in the appended claims.

In the accompanying drawings, which illustrate preferred embodiments of the invention and throughout the several views of which corresponding reference characters are used to designate corresponding parts:

Fig. 1 is a view in elevation of a motor-generator unit embodying the invention; and Fig. 2 is a view of the lower portion of the homopolar generator shown partly in central vertical section, the sections being taken along various radial lines to best illustrate the invention.

It will be appreciated from a complete understanding of the present invention that the improvements thereof may be embodied in apparatus of widely varying capacities and intended for widely different types of service; that in certain of their broader aspects many features of the present complete system may be utilized independently of other features and that the present improvements may be embodied in widely differing structural forms. The present disclosure, therefore, of a particular structural embodiment is to be regarded in an illustrative and not in a limiting sense.

The motor generator combination 1 comprises a homopolar generator portion 2, a motor driving portion 4, and an exciter 6 arranged in concentric fashion one above the other in a single casing and the rotors of which are all secured together upon a common shaft 8. The single casing for the motor generator unit comprises a series of casing sections 10, 12, 14, and 16 which are suitably bolted together as by means of bolts 18.

The homopolar generator 2 comprises essentially two complementary similar halves, one of which is housed within the casing 10 and the other of which is housed within the casing 12 in generally the same manner as is disclosed and claimed in J. V. Caputo Patent No. 2,005,609, dated June 18, 1935.

In the present construction a laminated core 20 is provided on the shaft 8 for rotation therewith and is aligned with a laminated field structure 22 held rigid with the lower casing section 10. In the said Caputo patent, flux flows longitudinally of the rotating shaft through a series of laminated core structures arranged longitudinally of the shaft; however, in the present application, flux flows directly into the shaft and longitudinally therethrough to the lower end portion, some of the flux returning to the lower casing section 10 across an air gap 24 into an annular platelike portion 26 of the section 10 and then upwardly through legs 28 of the casing section 10 back to the laminated field structure 22 and across an air gap 30 back to the laminated core 20. Other of the flux passing downwardly longitudinally through the shaft 8 flows outwardly through a flywheel 32 which is keyed by means of key 34 to the lower end of the shaft 8 through an air gap 36 to the annular platelike portion 26 and then returns to the laminated core in the manner above described in connection with the flux which passes across the air gap 24.

By properly proportioning the length of the air gaps 24 and 36, the flux made to pass across the gap 36 may be proportioned so that substantially the entire weight of the flywheel 32 may be supported due to the attractive effect of the flux passing across the gap 36. If desired, the gaps 36 and 24 may be so proportioned that not only the weight of the flywheel 32 is supported by flux passing across the gap 36 but also the weight of the other parts carried by the shaft 8 so that the end thrust during operation of the motor generator 1 may be relieved from the lower bearing 38 thereof. The lower bearing 38 for the shaft section 8b is preferably carried by a lower end bell 40 of the casing section 10 which is secured thereto as by stud screws 42. Bolts 44 may extend through other apertures in the bell 40 whereby the motor generator 1 may be secured to a suitable footing 46. The end bell 40 is preferably made of non-magnetic material such as stainless steel or aluminum bronze and is electrically insulated from the bearing 38 by suitable insulation 47. Similarly an upper end bell 49 of nonmagnetic material carries an upper bearing for the upper shaft section, the upper bearing being electrically insulated from the bell 49 by suitable insulation.

The upper portion of the homopolar generator 2 located within the casing section 12 is similar to that described and comprises an upper laminated core, a laminated upper field structure separated by an air gap so that flux from the upper field structure may flow across the gap through the upper laminated core upwardly through the shaft 8 radially outwardly across an air gap and back to the laminated upper field structure through the casing section 12. The laminated cores are provided with laminated inductors 48 which are spaced circumferentially therearound and extend substantially parallel to the longitudinal axis of the rotating common shaft 8. As shown in said Caputo patent, the portion of the inductors 48 located in the core 20 are preferably slightly circumferentially offset from the portion of the inductors 48 carried by the laminated upper core to provide a diagonal connecting portion to permit limited longitudinal expansion and contraction of the inductors 48. The ends of the inductors 48 are each connected to radial flanges 52 of collector rings 54. The rings 54 are located concentric of the shaft 8 and held for rotation therewith between wedge-shaped collars 56. Annular insulating members 58 insulate the collector ring 54 from the wedge-shaped collars 56 whereby the ring 54 is electrically insulated from the shaft 8 and spaced therefrom to provide an annular coolant chamber 57. The collector ring 54 is located longitudinally along the shaft intermediate the core 20 and the annular platelike portion 26.

A similar ring is placed above the upper core and below an upper horizontal magnetic platelike number. Suitable field windings 60 are provided on the upper surface of the annular portion 26 for inducing a flow of flux across the air gaps 24, 30, and 36 in a path as above described.

The laminated field structures are provided with longitudinally extending conductor busses 64 which are parallel with the inductors 48 and are preferably equally spaced around the field structures. The sets of conductor busses carried by the field structures, unlike the inductors 48, are not interconnected together. All of the conductor busses 64 associated with the field structure 22 are electrically connected to an annular conducting ring 66 which serves as one output terminal of the homopolar generator 2. The conductor busses 64 associated with the upper field structure are likewise all connected together to a similar annular conducting ring 68 which serves as the other output terminal of the homopolar generator 2. The rings 66 and 68 are closely adjacent one another but are insulated from one another by an annular insulating ring 70. The outwardly extending end portions of all of the conductor busses 64 overlie the collector rings. To each of these overlying portions of the busses 64 is secured a brush holder 72 carrying one or more brushes which are resiliently urged against the associated collector rings.

The common shaft 8 of the motor generator 1 comprises a section 8a which is magnetic in character having secured thereto as by bolts a lower end section 8b of nonmagnetic material and having a similar end section also of nonmagnetic material at its upper end. The nonmagnetic end sections may, for example, be aluminum bronze or stainless steel. The rotating member of the driving motor 4 is suitably secured to rotate the common shaft 8, causing rotation of the rotating portions of the homopolar generator 2 and will also cause rotation of the rotor of the exciter 6. Preferably a three-phase alternating current motor is employed; however, any other type motor, whether alternating current or direct current, may be utilized. The exciter 6 may be any of the direct current generator types of proper rating whereby a direct current voltage across its output terminals will be produced in accordance with its speed of rotation and the degree of energization of its exciting winding as will be more thoroughly brought out hereinafter.

The shaft 8 has a longitudinal central aperture or passageway 78 extending substantially the length of the shaft and a plurality of radially extending passageways leading from the aperture 78 to annular chambers 57 formed between the outer peripheral surface of the shaft 8 and the inner peripheral surface of the collector ring 54 and bound at its top and bottom by the wedge collar 56. The radial passageways 82 are spaced around the shaft 8 in such a manner that the static balance of the shaft 8 is preserved. Similar passageways interconnect the aperture 78 of the shaft 8 with a similar annular chamber intermediate shaft 8 and the upper collector ring located within the upper casing section 12.

It is believed that the remaining details of construction may best be understood by reference to a description of operation of the motor generator 1 which is as follows:

Upon energization of the motor 4 by suitable means well known in the art and not shown herein for simplicity, the shaft 8 will be rotated at motor speed. A suitable direct current energizing circuit which includes the output terminals of the exciter 6 is connected to cause exciting current to flow through the field windings 60 of the homopolar generator 2. With the field windings 60 excited, flux will flow through the paths in the generator hereinbefore described and across the air gaps 24, 30 and 36 and air gaps similar to gaps 24 and 30 in the upper portion of the homopolar generator 2. This flux passes substantially radially across the gaps 30 and through the laminated cores 20 downwardly and upwardly through the shaft section 8a. It should be noted that since the end bells 40 and 49 and lower and upper shaft sections are of nonmagnetic material and will not conduct flux, the flux path will not extend through the bearings. Since the bearings are completely insulated from the end bells 40 and 49 no current will pass therethrough due to any possible unbalance in voltage induced due to the cutting of the flux by the shaft section 8a.

As the shaft section 8a and the cores 20 and 20a rotate, this flux will be cut by the inductors 48, causing a voltage to be induced therein. Since the direction of cutting of the flux by the inductors 48 associated with the core 20 and the inductors 48 associated with the upper core is in the same direction, the voltages induced by the cuttings of the flux passing across the gaps 30 will be additive. The upper collecting ring will be of one polarity and the lower collector ring 54 will be of the opposite polarity. The collector rings are electrically connected by means of the associated brushes to the respective sets of conductor busses 64 and therethrough to the conducting rings 66 and 68 which form the output terminals of the homopolar generator 2.

When the welding current load circuit connected between rings 66 and 68 is closed, whereby welding current is supplied thereto, the power required to effect the welds is usually somewhat greater than the power which may be transferred by the driving motor 4 to the shaft 8 so that the shaft 8 tends to reduce somewhat in speed. Due to the presence, however, of the flywheel 32 and the kinetic energy thereof, the shaft 8 will tend to rotate at a substantially constant speed and supply additional energy to the generator 2.

As the generator 2 is so used, heat due to the passage of current through the collector rings 54 and 54a will be generated therein, causing coolant to circulate through the annular chambers 57, which flow of coolant through chambers 57 will be somewhat proportional to the current output of the generator 2 whereby the rings 54 will be maintained with the normal temperature operating limit.

What is claimed and is desired to be secured by United States Letters Patent is as follows:

1. In an electric power-converting apparatus, a homopolar generator having a rotor arranged to rotate about a vertical axis and including a flux circuit having first and second portions arranged in parallel circuit with each other, said first circuit portion having a substantially vertically extending gap, a flywheel arranged to rotate with said generator rotor, said second circuit portion including said flywheel and a horizontally extending gap immediately above said flywheel whereby the end thrust of said rotor is at least partially carried by the flux flowing through said flywheel.

2. A vertically arranged homopolar generator comprising a stationary flux-conducting member and a rotatable flux-conducting member providing a closed flux path, means providing a first flux path portion including a vertically extending non-magnetic portion, a flux-conducting member carried by said rotatable flux-conducting member and arranged in underlying relationship with said stationary flux member to provide a second path portion in parallel circuit with said first path portion, said second path portion including a vertical gap, the reluctance of said second flux path portion from said stationary flux member through said last-named flux-conducting member across said gap to said rotating flux-conducting member being so related to the reluctance of said first path portion that the flux flowing through said last-named flux-conducting member and across said gap will at least partially support the weight of said rotatable flux-conducting member.

3. A vertically arranged homopolar generator comprising a stator and a rotor, means providing a closed flux path through said stator and said rotor and including a flux circuit having first and second flux path portions to provide parallel flux circuit portions in said flux circuit, means providing a substantially vertical gap in said first flux path portion, a stationary flux conducting member in said flux circuit, a flux-conducting metallic member rotatable with said rotor, said member underlying said stationary flux conducting member and spaced from said stationary member to provide a substantially horizontal gap across which flux may flow, said gaps being so proportioned relative to each other as to permit sufficient flux to flow between said horizontal portion and said member to at least partially support the weight of said member and said rotor.

4. A vertically arranged homopolar generator comprising a supporting structure having a transversely extending wall adjacent its lower end portion, said wall having a central aperture therethrough and a lower surface, a vertically extending rotor shaft in said structure and extending through said aperture, said shaft being of lesser cross-sectional area at its portion within said aperture than the cross-sectional area of said aperture to provide a substantially vertical gap, a flywheel carried by said shaft below said wall and having an upper surface spaced from said wall lower surface to provide a substantially horizontal gap, means operable to set up a flow of flux through said wall and across said first and second-named gaps into said shaft, said gaps being so interproportioned as to provide sufficient flux flow across said second-named gap to said flywheel to support at least partially the weight of said shaft and said flywheel.

5. A vertically arranged homopolar generator having a supporting structure including vertically spaced bearings, a shaft carried by and rotatable in said bearings, a laminated rotor carried on said shaft, a laminated field carried by said structure in radial alignment with said rotor, said rotor and said field and said structure and said shaft co-operating to provide a closed flux path, means providing a substantially vertical air gap in said flux path between said structure and said shaft, a flywheel carried by said shaft and having a portion extending across said air gap adjacent a portion of said flux path in the stationary parts of the generator, said adjacent portion of said flywheel being slightly spaced from said flux path portion to provide a substantially horizontal air gap, said air gaps being so proportioned relative to each other that a portion of the flux flows across said last-named gap into said flywheel and therethrough into said shaft whereby said flywheel is at least partially supported thereby to decrease the end thrust on said bearings.

JAMES V. CAPUTO.
THOMAS J. CRAWFORD.

References Cited in the file of this patent
UNITED STATES PATENTS

| Number | Name | Date |
|---|---|---|
| 371,199 | Kimball et al. | Oct. 11, 1887 |
| 457,902 | Kintner | Aug. 18, 1891 |
| 804,440 | Steinmetz | Nov. 14, 1905 |
| 876,943 | Canfield | Jan. 21, 1908 |